United States Patent Office 3,532,307
Patented Oct. 6, 1970

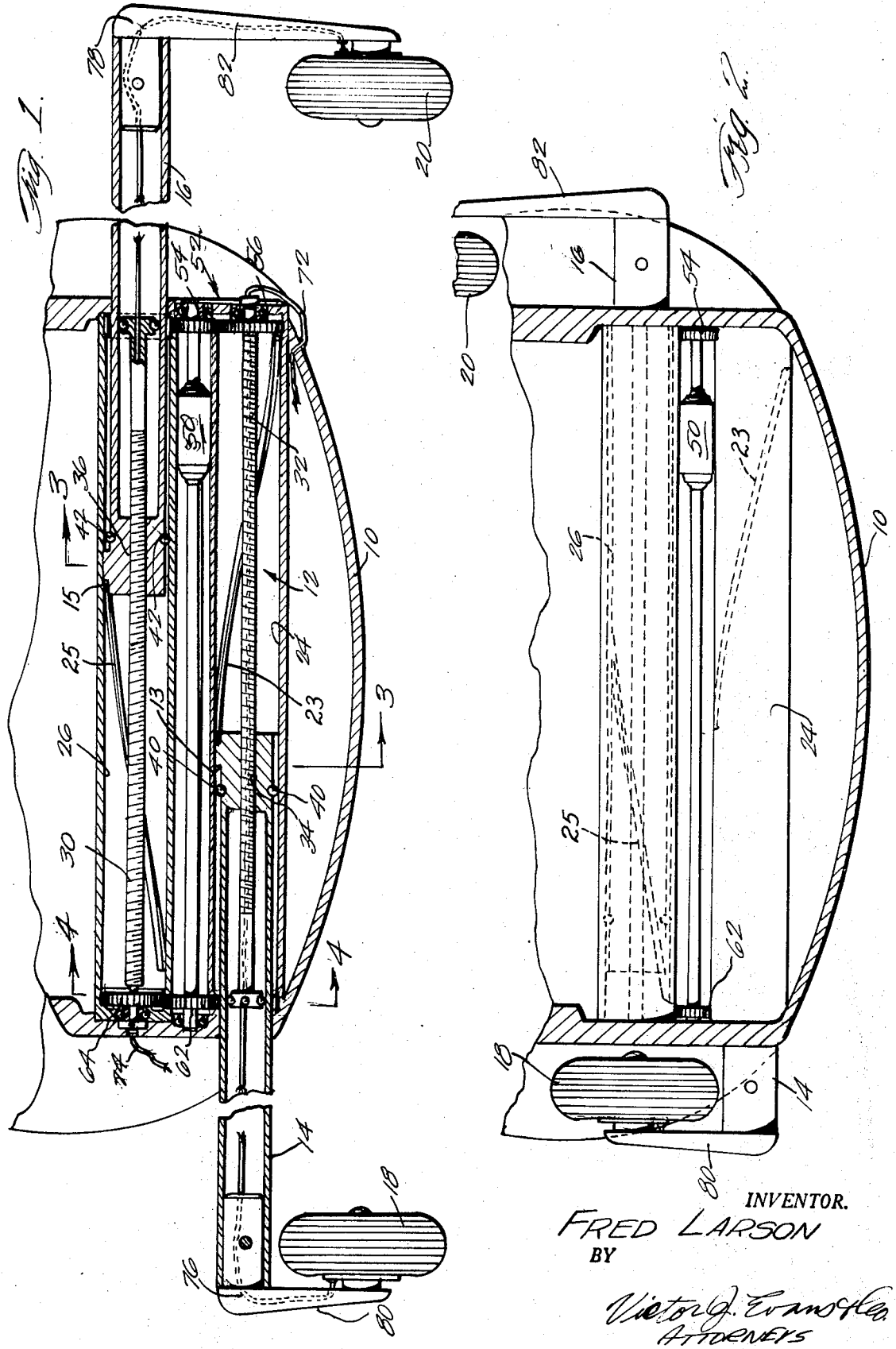

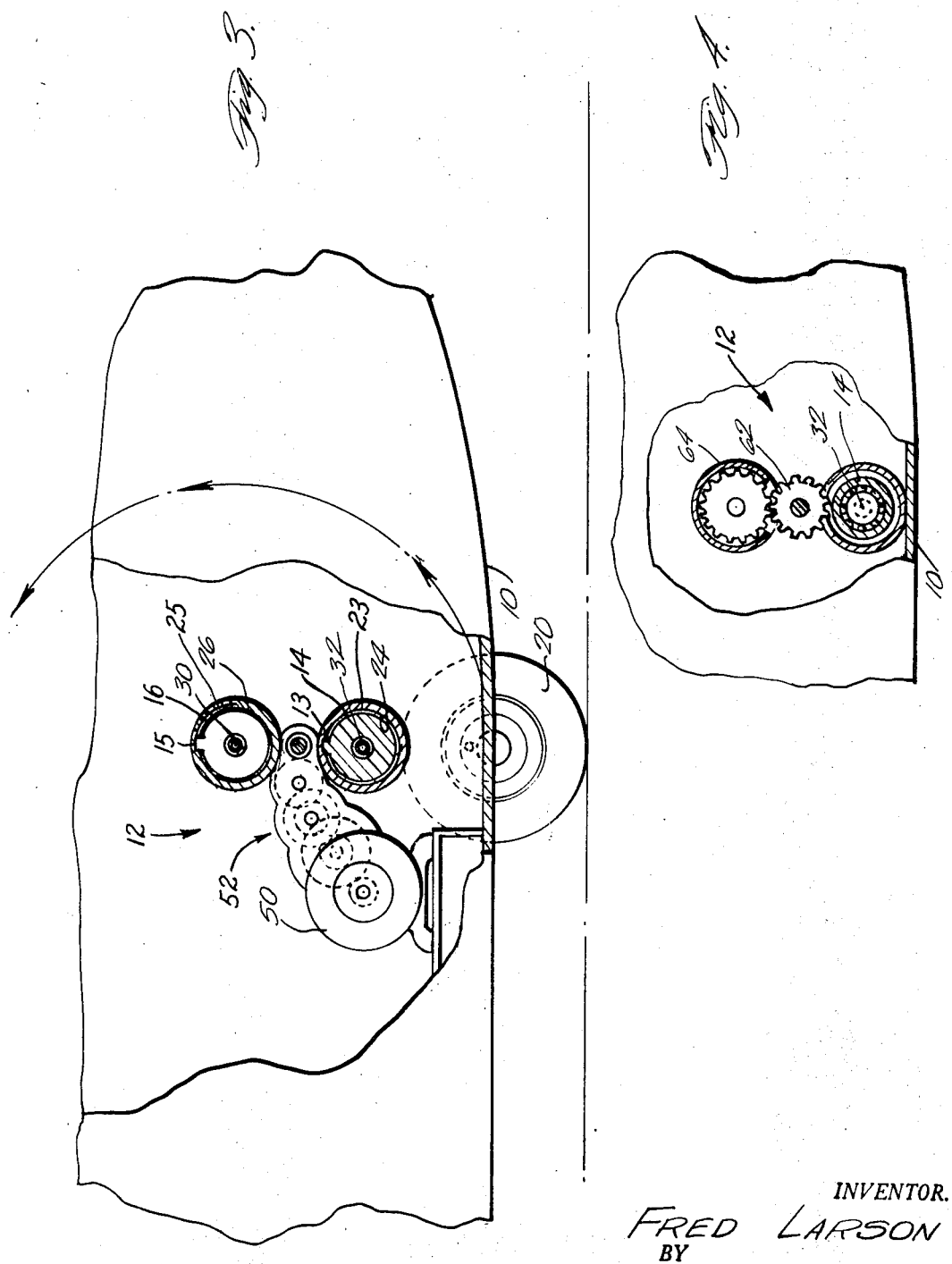

3,532,307
RETRACTABLE LANDING GEAR WITHOUT
HYDRAULIC MEANS
Fred Larson, 1776 42nd Ave., Vero Beach, Fla. 32960
Filed July 11, 1968, Ser. No. 743,990
Int. Cl. B64c 25/12
U.S. Cl. 244—102                                5 Claims

ABSTRACT OF THE DISCLOSURE

The present invention relates to mechanical means for retracting or elevating and lowering into place landing gear without the use of hydraulic means, in which there is a motor for actuating a threaded member for extending and retracting the landing gear into and out of the landing position and for returning it to a stored or up position. Electric brake means or the like may also be provided.

---

The present invention relates to an improved retractable landing gear without using hydraulic means, and more particularly the landing gear is retractable by using threaded means actuated by a motor driving a gear for turning the threaded shaft members and in which the landing gear is of such a size that it can be used for two or four place planes.

A further object of the invention is to provide a lightweight retractable landing means which is simple in construction by having only four gears without hydraulics and requires only a small electric motor to operate, and only 55 revolutions of a shaft are required to move the wheels from the raised to the lowered position.

An additional object of the invention is to provide brake tabs or retaining means for holding the wheels in the lowered or raised position, and which is overcome by means of the actuation of the motor in either of its forward or reverse direction.

A further object of the invention is to provide means for actuating brakes in the wheel tubs or brake drums, and in which the brakes are actuated by conduit means, whether electrical wiring or hydraulic tubing, which connect to the brake drums on the wheels and in which the coupling means extend through the supporting and retractable threaded means and thence to the source drive control means.

The above and other objects and advantages of the invention will become apparent upon full consideration of the following detailed description and accompanying drawings in which:

FIG. 1 is a cross-sectional view of a fuselage of an aircraft embodying the present invention in which the retractable landing gear is shown with the wheels in the lowered position;

FIG. 2 is a broken away view showing a similar embodiment in which the wheels are in the raised position;

FIG. 3 is a cross-sectional view taken along lines 3—3 of FIG. 1; and

FIG. 4 is a cross-sectional view taken along lines 4—4 of FIG. 1.

Referring now to the drawings, there is shown the fuselage 10 with the retractable landing gear apparatus 12 and supporting shafts 14, 16 for wheels 18, 20 respectively. The shafts 14, 16 slide within cylinder 24, 26 and within these cylinders 24, 26 there are drive rods 30, 32 which threadedly engage with a threading mating portion 34, 36 of the shafts 14, 16. Ridges 13, 15 of shafts 14, 16 respectively fit and slide within helical bores 23, 25 of cylinders 24, 26 respectvely. A ball bearing to aid in the rotation of the shafts is provided at 40, 40, 42, 42.

The shafts are driven by a motor 50 which turns a gear arrangement 52 for driving a drive gear 54 and a follower gear 56 that is secured to the rod 32. Similarly, the motor 50 drives a drive gear 62 which drives a follower gear 64 which is connected to the rod 30, and thus due to the threaded engagement 36 rotates the wheels 18, 20 about 55 turns so that they are raised or lowered from one extreme position to the other upon complete traverse of the threaded members 34, 36 from one end of the cylinder to the other.

The illustration of the invention shown in FIG. 2 shows the apparatus of the retractable landing gear in which the wheels 18, 20 are in their upward and retracted position; whereas the illustration of FIG. 1 shows the wheels in the downward position and in which about 55 turns of the rods 30, 32 are required to displace the wheels from the position of FIG. 1 to the position of FIG. 2.

In FIG. 3 is shown a cross-sectional view taken along lines 3—3 of FIG. 1 showing the inner details of the rods 30, 32, the cylinders 14, 16 and the wheel 20 in the down position, in accordance with the description of the invention set forth above.

FIG. 4 shows the further details taken along lines 4—4 of FIG. 1 showing the drive wheel 62, the follower gear 64 and the other components within the cylinder 12.

Also shown in the drawings is the manner in which brake actuation means are energized or actuated from a source (not shown) so that the wheels 18, 20 are braked while the plane is landing, or while the plane is taxiing around.

FIG. 1 and the associated figures show the manner in which the brake means are actuated from an electrical source control means (not shown) and coupled to the brake motor in the wheels 18, 20 by way of a conductor wire 72 for the hollow rod 32 and by electrical wire 74 for the hollow rod 32. The conductor thus passes through the rods 30, 32, and the wire at point 76, 78, respectively, is turned so that it passes downwardly through the wheel support member 80, 82, respectively, until the conductor 76, 78 reaches the motor for driving the brake in retarding the forward motion of rotation of the wheels 18, 20.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. A retractable landing gear without using hydraulic means comprising a pair of cylinders disposed parallel to each other and separated by a control cylinder having a drive motor therein, each of a pair of cylinders having a telescopically engaging shaft for sliding in and out thereof, concentric rod means within each of said pairs of cylinders having threads thereon for threadedly engaging an end of the telescopic shafts, gear follower means within an end of each cylinder for driving said respective rods, the motor in the intermediate cylinder having a rod and gear arrangement for driving the aforementioned gears, wheels disposed on the ends of the shaft for supporting the aircraft when they are in the down position, and for being retracted when the wheels are in an upward and inner position.

2. The invention according to claim 1 wherein a helical bore is disposed within each of the pairs of cylinders for receiving a ridge of the telescopically engaging shaft so that the shaft is allowed to make a part of a turn from a lowered to a raised position and vice versa, while the said motor makes about 55 revolutions.

3. The invention according to claim 2 wherein said pairs of cylinders are mounted in the fuselage of an aircraft.

4. The invention according to claim 3 wherein bearing means are disposed about the telescopically engaging shaft for aiding the movement thereof within and out of the pair of respective cylinders.

5. The invention according to claim 4 wherein brake means energized electrically from a conductor passing through the rod and a wheel support member connects with a brake motor for braking the forward motion of the wheel when the brake motor is energized.

References Cited

UNITED STATES PATENTS

| | | | |
|---|---|---|---|
| 2,115,701 | 5/1938 | Bear et al. | 244—102 |
| 2,185,235 | 1/1940 | Swanson | 244—102 |
| 2,309,550 | 1/1943 | Tampier | 244—102 |
| 2,478,426 | 8/1949 | Satre | 244—102 |

MILTON BUCHLER, Primary Examiner

P. E. SAUBERER, Assistant Examiner

U.S. Cl. X.R.

280—34, 43.17